United States Patent [19]

Grueninger

[11] Patent Number: 5,613,669
[45] Date of Patent: Mar. 25, 1997

[54] CONTROL PROCESS FOR USE IN THE PRODUCTION OF PRINTED PRODUCTS AND MEANS FOR PERFORMING THE PROCESS

[75] Inventor: Baptist Grueninger, Russikon, Switzerland

[73] Assignee: Ferag AG, Hinwil, Switzerland

[21] Appl. No.: 455,009

[22] Filed: May 31, 1995

[30] Foreign Application Priority Data

Jun. 3, 1994 [CH] Switzerland ........................ 01748/94

[51] Int. Cl.$^6$ .................................................. B65H 39/04
[52] U.S. Cl. ................. 270/52.06; 270/52.15; 270/52.26
[58] Field of Search ............... 270/52.02, 52.04, 270/52.06, 52.15, 52.16, 52.2, 52.26, 52.29, 52.3, 58.02, 58.03, 58.2, 52.21, 58.22, 58.29

[56] References Cited

U.S. PATENT DOCUMENTS

| | | | |
|---|---|---|---|
| 4,799,661 | 1/1989 | Nail | 270/54 |
| 4,923,189 | 5/1990 | Nail | 270/52.04 |
| 5,033,725 | 7/1991 | Van Duursen | 270/52.02 |
| 5,039,077 | 8/1991 | Gunther, Jr. | 270/58 X |
| 5,067,088 | 11/1991 | Schneiderhan | 270/52.02 X |
| 5,143,362 | 9/1992 | Doane et al. | 270/54 X |
| 5,280,895 | 1/1994 | Meier | 270/58.03 |
| 5,317,654 | 5/1994 | Perry et al. | 270/52.02 X |
| 5,458,323 | 10/1995 | Magee et al. | 270/52.02 |

FOREIGN PATENT DOCUMENTS

| | | |
|---|---|---|
| 58-22257 | 2/1983 | Japan . |
| 1-231765 | 9/1989 | Japan . |
| 3-108591 | 5/1991 | Japan . |
| 4-77295 | 3/1992 | Japan . |
| 4-361093 | 12/1992 | Japan . |

OTHER PUBLICATIONS

Uchida Tatsutoshi et al, *Patent Abstracts of Japan*, vol. 17, No. 233, 12 May 1993, of Japanese 04 361 093, Uchida Seihon Kakou, 14 Dec. 1992.
Egashira Yasuro, *Patent Abstracts of Japan*, vol. 16, No. 290, 26 Jun. 1992, of Japanese 04 077 295, Toppan Printing Co. Ltd., 11 Mar. 1992.
Matsuo Hideaki et al, *Patent Abstracts of Japan*, vol. 15, No. 298, 29 Jul. 1991, of Japanese 03 108 591, Toppan Printing Co. Ltd., 8 May 1991.
Ozawa Tatsuro et al, *Patent Abstracts of Japan*, vol. 13, No. 559, 12 Dec. 1989, of Japanese 01 231 765, Toppan Printing Co. Ltd., 18 Sep. 1989.
Moriwaki Norio et al, *Patent Abstracts of Japan*, vol. 7, No. 98, 26 Apr. 1983, of Japanese 58 022 257; Nihon Shiyashin Insatsu K.K., 9 Feb. 1983.

*Primary Examiner*—John E. Ryznic
*Attorney, Agent, or Firm*—Walter C. Farley

[57] ABSTRACT

The control process according to the invention is usable with high performance production processes for producing printed products by collecting, inserting and/or collating, e.g. with the aid of a drum (10). It comprises recording an image of the products being formed following each addition of a further component with a camera (K), comparison of the recorded image with a corresponding, stored calibration image, and using the results of the comparison for generating control signals, e.g. for discharging faulty products or activating alarm means. Instead of stationary image recording means such as cameras, movable reading heads can be used in the inventive process also.

14 Claims, 3 Drawing Sheets

CONTROL PROCESS FOR USE IN THE PRODUCTION OF PRINTED PRODUCTS AND MEANS FOR PERFORMING THE PROCESS

FIELD OF THE INVENTION

The invention is in the field of the further processing of printed products and relates to a control process for use in the production of printed products such as newspapers, journals, magazines, brochures, etc. from a plurality of different, printed components, e.g. individual sheets. The invention also relates to a means for performing said control process.

BACKGROUND OF THE INVENTION

Printed products such as newspapers, journals, brochures, etc. often consist of a plurality of different printed components, e.g. a plurality of printed sheets, which are brought together by collecting, insertion or collation and are then e.g. sewn or stitched together or combined by an adhesive binding. For producing such printed products in high performance processes collecting, inserting and collating drums or corresponding sections are known for the purpose of collecting, inserting and/or collating. During collecting saddle-shaped supports and during inserting and collating V-shaped compartments are continuously directed past a plurality of addition points and at each addition point a further component, e.g. a further sheet is added to the product in production, whereby collecting starts with the innermost, folded sheet, inserting with the outermost, folded sheet and collating with a first, usually unfolded component. The collecting, insertion and collating processes can also be combined. With the known high performance equipment it is possible to achieve outputs of up to approximately 40,000 products per hour.

On the known equipment for combining different printed components to form a product, the formed product is usually controlled by a thickness measurement. This thickness measurement establishes whether the formed product thickness corresponds to a nominal thickness or whether it diverges from the latter. Products with thicknesses diverging from the nominal thickness are identified as defective and correspondingly dealt with, assuming that they contain the individual components in excessive numbers when too thick and that components are missing if too thin. In certain circumstances when using this control method products in which simultaneously components occur several times, whereas others are missing, can be interpreted as being fault-free. As the thickness of the individual components, e.g. sheets, is subject to a dispersion, in particular for products having a large number of components, it can also occur that the sum of said dispersions brings about a divergence of the product thickness from the nominal thickness, which is of the same order of magnitude as the thickness of the individual components, so that actually faultless products can be identified as faulty. It is not possible with the described method to identify as faulty, products which contain incorrectly printed components or incorrectly oriented components. In other words the thickness measurement on the finished product is a fault or defect control which is only effective to a very limited extent.

For controlling the homogeneity of individual components, particularly sheets, optical/electronic methods are also known. For example, EP-A1-534115 (Grapha Holding) proposes directing each sheet over a read head and reading the printing sample of a given area of each sheet during this movement, e.g. in the same way as bar codes are read. The printing sample read is then compared with a nominal sample and a fault signal generated in the case of variations. The read head is e.g. so fitted to a feeder, that on removing from the magazine of the feeder each sheet is passed over the read head. By corresponding synchronization of the removal movement and the reading function it is ensured that the same area is read on each sheet removed. Slight differences in the position of the individual sheet with respect to the read head can be interpreted as such by the software and eliminated from the evaluation process, if during the comparison of the read sample and the nominal sample the two samples to be compared are mutually displaced within certain limits until a maximum coincidence is found.

For a control method using a read head, as described hereinbefore, the individual sheets must be moved over said read head in a direction parallel to their main aces or surfaces. If the processing, such as e.g. in the described use, the removal from the magazine of a feeder incorporates such a movement, then the control method is advantageous. However, if the sheets (components of the product to be produced) only have to be moved in the described way for carrying out the control, the control method with the read head as described above, becomes complicated and costly. In the aforementioned process for producing printed products by joining individual printed components in a collecting, inserting and/or collating process it would be conceivable to have feeders with read heads in the vicinity of the different supplies. This would make it possible to detect and correct incorrect components, components with the incorrect orientation and in certain circumstances missing components in the component supply flows necessary for producing the product, but not faults and errors occurring between the supply and the collecting/inserting/collating device or during product production.

As in a gathering area corresponding to the aforementioned high performance processes, i.e. where components are added to products being produced, both the resulting products and the supplied components are conveyed with the main surfaces oriented substantially transversely (not parallel) to the conveying direction, an alternative or additional movement would have to be performed for a control with a read head as described above.

SUMMARY OF THE INVENTION

An object of the invention is to provide a control process for use in the high performance production of printed products from a plurality of different printed components, the product production taking place in per se known manner by collecting, inserting and/or collating with correspondingly equipped drums or rotary systems, without the individual components or the products obtained therefrom having to be specially moved or oriented for control purposes and where the control process makes it possible to more reliably detect more fault or defect types than is possible with a thickness measurement on the finished product. Another object of the invention is the provision of a means for performing the control process.

The process according to the invention essentially comprises controlling the product being formed, after addition of a further component, using an optical/electronic control process. This optical/electronic control process may be e.g. an image recording (e.g. through a stationary, video camera) and a corresponding image processing (comparison with a nominal image) or it may be a reading process (e.g. through a read head moved over the product to be controlled) and a corresponding processing of the read data (comparison with nominal data), whereby in each case only a limited area of the product is controlled. In each case this controlled area of the product may either contain a particularly specific feature in the printed matter or a code (e.g. bar code) specially printed for the control purpose. The control process performed on the product during the production of the product compared with controls of the components at the component supplies leads to the advantage that it is possible to detect faults also, which e.g. occur between a feeder and the addition of the corresponding component to the product being formed or during said addition. The advantage of an optical/electronic control process as a control method compared with thickness measurement is that not only missing, but also defective or incorrectly oriented components are detected as faults. What is not detected with the inventive control method are components of which a plurality is supplied instead of only one, which is considered to be less serious by the consumer. However, products faulty in such a way can be eliminated from the further processing e.g. by a thickness measurement on the finished product, in addition to the optical/electronic control of the product being formed.

BRIEF DESCRIPTION OF THE DRAWINGS

The control process and the means for performing the process according to the invention are described in greater detail hereinafter with reference to the attached figures wherein.

DESCRIPTION OF THE PREFERRED EMBODIMENTS

Figure 1:
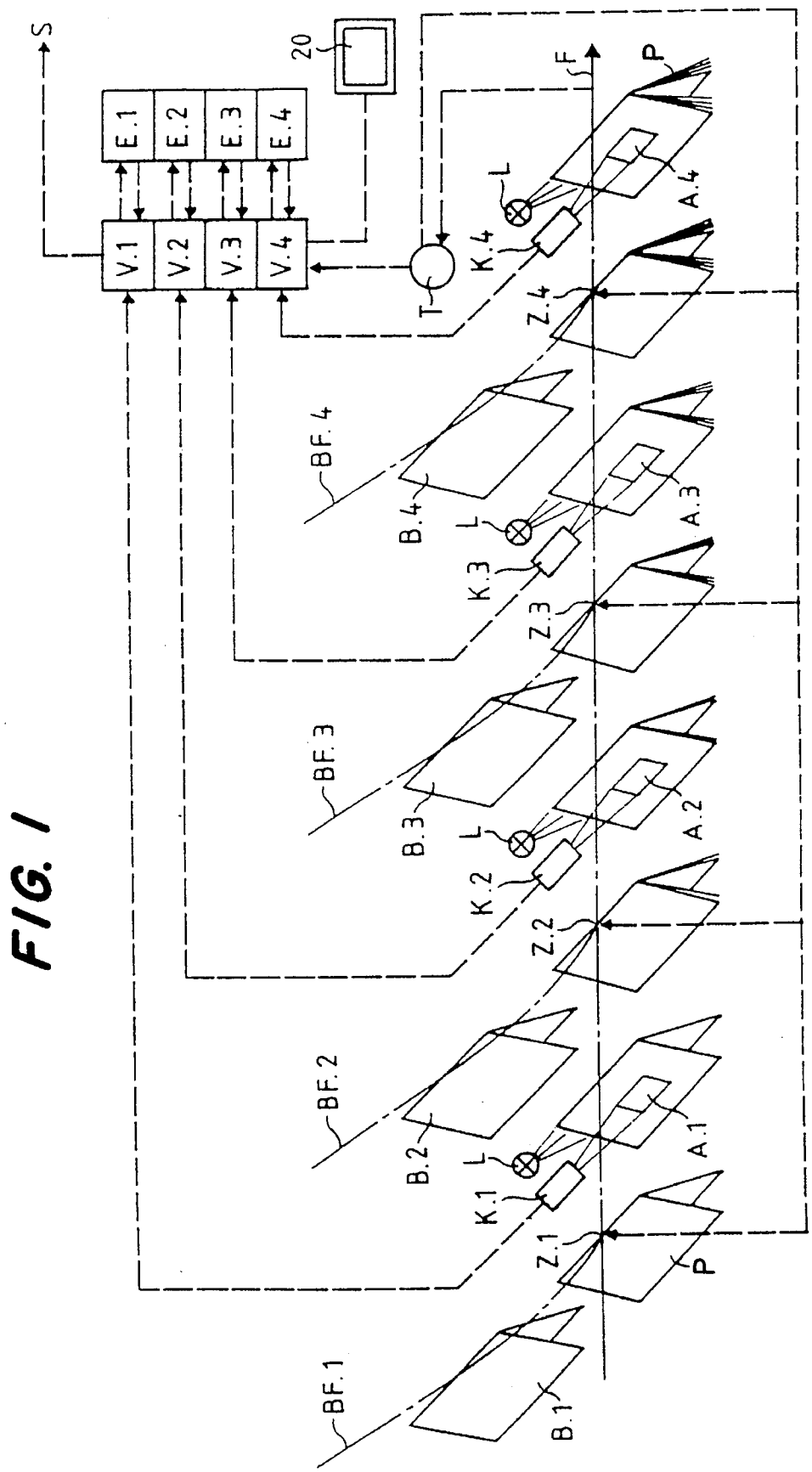
FIG. 1 shows the principle of the inventive control process and the means for performing it used in conjunction with a collecting process for gathering components in order to produce a printed product.

FIG. 1 shows the principle of the control process according to the invention in the exemplified application to a collecting process for producing leafletlike products by the collection of folded sheets on saddle-shaped supports, which supports are not shown in the drawing. As mentioned hereinbefore, during collecting (as during insertion or collation) in high performance processes, the products P in production, as well as the individual components to be added to the products being formed, in this case folded sheets B.1 to B.4, are conveyed transversely, i.e. not parallel to the orientation of their main surfaces, at least in the gathering area. The products P being formed constitute a product flow, in which the products are conveyed in the conveying direction F with distances between their main surfaces of e.g. approximately 10 to 20 cm and with a conveying cycle of e.g. approximately 10 copies per second (cycle time approximately 0.1 sec).

In the drawing a conveying flow of products P is shown with a conveying direction F. It is also possible to see the addition stages Z.1 to Z.4 for the successive addition of four folded sheets B.1 to B.4 to each product being formed, said sheets being supplied as sheet flows with the conveying directions BF.1 to BF.4. In said sheet flows the conveying direction is directed transversely, i.e. not parallel to the main surfaces of the sheets. From left to right in the drawing each product is formed by the successive addition of sheets.

The control process according to the invention consists of applying an optical/electronic control process to each product P of the product flow following each addition station Z.1 to Z.4, which optical/electronic control process consists e.g of image recording and processing of the recorded image, the processed image always relating to the component last added. For performing the process, in conveying direction after each addition station, a camera K.1 to K.4 (e.g. a video camera), is located outside the product flow and directed at an angle relative to the conveying direction F.

The image recording function, which is in the widest sense supplying an instantaneous image to an image processing means V.1 to V.4, operates with the conveying cycle given by the product flow in such a way that for each product of said flow an image is supplied to the image processing means by each camera. The phase shift between the conveying cycle and the image recording function is such that on each image passed for further processing is shown only a single product or a detail (A.1 to A.4) of a single product. For the synchronization of the conveying process and the image recording function a synchronizing means T is provided, which records the present conveying cycle, subdivides it into a fine cycle, e.g. 100 times faster than the conveying cycle (cycle time of the fine cycle approximately 0.001 sec) and activates the image recording function following a given number of fine cycles within each conveying cycle.

The images taken by the cameras are compared in a per se known image processing means V.1 to V4 with a calibration image (nominal image), recorded in a calibration process, and stored (memories E.1 to E.4). The comparison result is further processed in per se known manner for generating control signals S e.g. for a discharge sorting gate (not shown) or for generating alarm signals for activating alarm means. It is also possible to provide optical means, e.g. one or more screens (20), by means of which personnel carries out the control function or monitors it. Such visual means are in particular advantageous for the calibration process described hereinafter.

The calibration process is performed with the same means. For the calibration process, the production of the products is started without the control function being activated. As soon as after each addition station a product in a formation stage corresponding to the addition station is present and the products of the product flow are in a recording position, i.e. when each camera is directed or directable onto a single product, a calibration function is activated. The calibration function essentially consists of each camera recording an image and of storing in electronic/digital form these images in a memory E.1 to E.4 associated with the corresponding camera.

Advantageously the calibration process is performed with the production means stopped and beforehand the already formed product and the settings of the cameras, which are advantageously directed onto very contrast-rich details, are visually checked and finely adjusted. It is also possible to perform a "flying" calibration on the operating machine with a constant setting, if e.g. there is a change from one product to another without production interruption and then a calibration process is initiated for the first new product being formed.

The recording position of the products in production is either predetermined by the synchronization means T or can be freely selected during the calibration process (for stationary calibration only) and stored in the synchronization means as a fine cycle number.

It is advantageous to record for calibration images larger details than for the control images. For image comparison purposes the control image can be software-shifted within the calibration image until maximum coincidence is found. This makes it possible to prevent correct components slightly displaced relative to the calibration image being interpreted as faults. The same effect can obviously be obtained by a control image, which is larger than the calibration image. If the products before recording of the control images are e.g. laterally oriented with conventional orienting means, the size difference between the calibration image and the control image can be limited to a minimum, whereby the time necessary for the image processing is reduced considerably.

As has already been stated, the conveying cycle is predetermined by the possibly variable conveying speed in the conveying direction F and by the fixed product spacing. With the same cycle the addition stages (Z.1 to Z.4) for the addition of the components and the image recording function (with fine cycle) are controlled, which is symbolically represented in FIG. 1 by a synchronization means T and corresponding signal lines.

In most cases it is necessary to illuminate the products in the recording position by a correspondingly oriented light source L, the exposure being constant or timed in the same way as the image recording.

Whereas during collecting the folded sheets are added on the outside to the products being formed and consequently the control images can be produced from the outside of said products, during insertion the folded or unfolded components are internally inserted into the product being formed and consequently the control images must be recorded on the inside of the centrally opened product. This is shown in FIG. 2, which is to be looked upon as a detail of a representation identical to FIG. 1 and in which is recorded by a camera K.5 a control image of an inserted, folded sheet B.5, the latter being the last added and therefore center sheet of the product P being formed.

Figure 2:
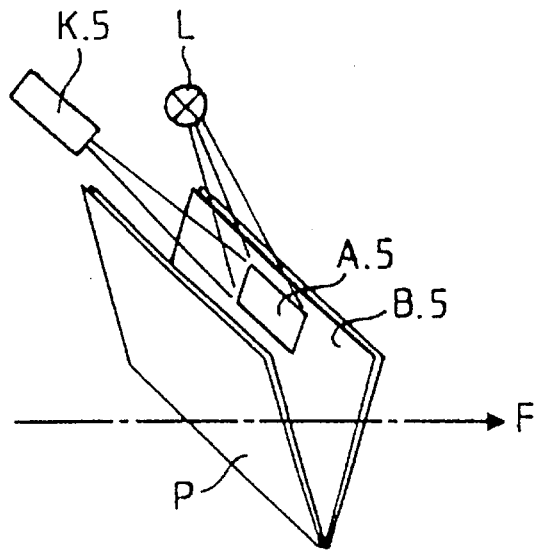
FIG. 2 shows a detail of the inventive control process and means for performing it used with an insertion process for gathering components in order to produce a printed product.
Figure 3:
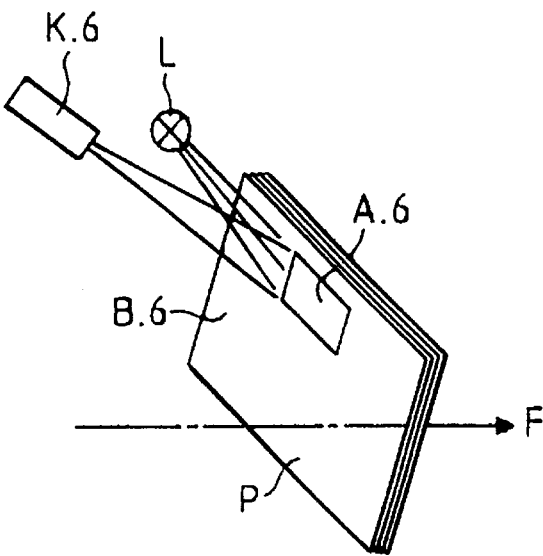
FIG. 3 shows a detail from the inventive control process and means for performing it used in conjunction with a collating process for gathering components in order to produce a printed product.

FIG. 3 is a detail corresponding to the detail of FIG. 2 of the control process according to the invention when applied to a collating process. In this process usually unfolded components (e.g. B.6) are stacked to form a product and the resulting, stack-like product P is conventionally brought together in a not shown, V-shaped compartment during continuous conveying in the direction F. The components of the collated stack are then usually joined together along one edge by e.g. an adhesive joint. FIG. 3 shows the resulting stack-like product P, to which is added as the last component the sheet B.6 and of which the camera K.6 has recorded a control image (detail A.6).

Figure 4:
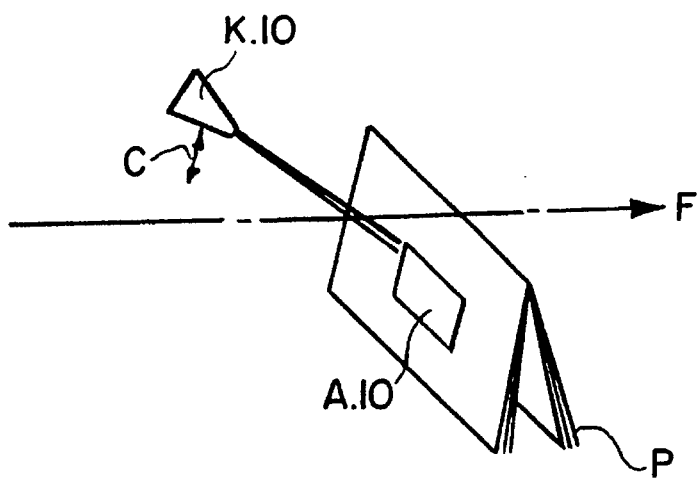
FIG. 4 shows a detail from the inventive control process and means used for performing it, which means contain a read head moved over the product for reading the corresponding information.

FIG. 4 shows a further detail in the same manner as FIGS. 2 and 3. This detail refers to a process according to the process of FIG. 1 in which instead of a stationary image recorder a movable read head (K.10) is used, which read head for recording information from the product being formed (P) is moved over a specific area A.10 of this product. This area contains as described above, either a specific part of the printed pattern or a code (e.g. bar code) specifically applied for the control purpose. In case of such a control code, which can be independent of the product, the above described calibration procedure might not be necessary, as such a code can be input into the system directly in digital form. For reading information off the product with a movable read head as well as with an image recording means, limited variations in the position of this information can be taken into account in the further processing, as is known by one skilled in the art.

In each control cycle the read head K.10 is moved over the area of the product to be controlled for reading the information required and it is then moved back into its original position again (double arrow C).

Figure 5:
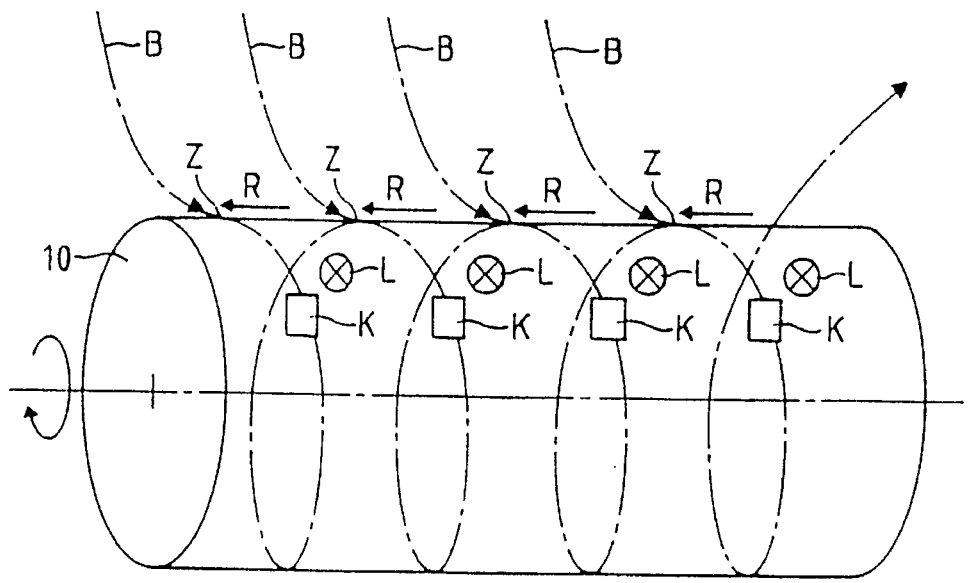
FIG. 5 shows a diagram of a collecting/inserting/collating drum equipped for the control process according to the invention.
Figure 6:
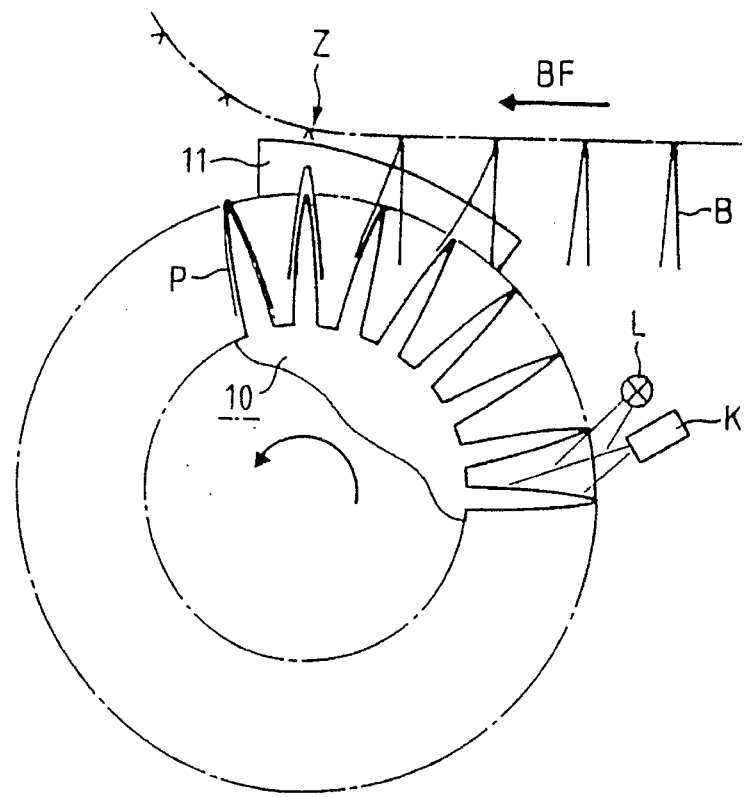
FIG. 6 shows a collecting drum equipped for the control process according to the invention in section.

FIGS. 5 and 6 very diagrammatically show a means with a drum (collecting/inserting/collating drum), in which the conveying direction F of the product formed is not substantially linear as in FIG. 1 (means e.g. with rotary system), but instead winds in a substantially spiral manner around a drum. The resulting products rotate with the drum 10 and are simultaneously displaced in the axial direction of the drum. FIG. 5 shows such a drum as a view with a viewing angle perpendicular to the drum axis, whereas FIG. 6 shows such a collecting drum in section at right angles to the drum axis.

The addition points Z are arranged in the case of a drum on an axially oriented line and this advantageously also applies with respect to the cameras or read heads K and light sources L. Advantageously the products are laterally oriented (R) prior to the control, e.g. by means of a straightening plate 11 against which the products are pushed. In the drum of FIG. 5 the cameras or read heads K are so arranged that the control takes place directly after the corresponding addition station Z. In the drum according to FIG. 5 the control (K) takes place directly before the addition station Z for the next component.

A special process for which the control process according to the invention is also suitable is the so-called personalized insertion (e.g. described in EP-511159 or U.S. Pat. No. 5,280,895 of the same applicant), in which into each individual product which is formed, only those components are inserted which are intended for said specific product (e.g. enclosures matched to the address of a journal). The addition stations are then controlled in such a way that in predetermined manner they either do or do not add the corresponding component to the particular product being processed. For the application of the control process according to the invention in such a case, the control process must be so adapted that the image recording or reading function is controlled by a master control system, so that image recording or reading and processing of the recorded data is only activated if the corresponding component was added to the specific product being formed. Thus, in other words, the image recording or reading function does not take place in rigidly timed manner and is instead matched to the composition of the products being formed.

Drums and rotary systems, as well as related devices for collecting, inserting and/or collating and which are suitable for the control process according to the invention, together with the associated means for supplying components to said systems are e.g. described in the following publications of the same application: CH-584153 or U.S. Pat. No. 3,951,399 and EP-0241634 or U.S. Pat. No. 4,709,910 for drums, EP-0341425 or U.S. Pat. No. 5,052,667 for collecting drums, EP-0095603 or U.S. Pat. No. 4,489,930 for collecting sections, CH-669944 or U.S. Pat. No. 4,743,005, EP-0341423 or U.S. Pat. No. 4,981,291 for drums with varying applications, EP-0346578 or U.S. Pat. No. 5,104,108 for rotary systems with varying applications.

I claim:

1. A process for controlling the production of printed products by collecting and inserting and/or collating a plurality of printed components (B.1–B.4) which differ from each other, the process comprising the steps of substantially continuously conveying the printed products being formed in a product flow in a direction (F) substantially perpendicular to an orientation of main surfaces thereof with a conveying cycle determined by conveying speed and product spacing in the product flow, at each of a plurality of adding stations (Z.1–Z.4), selectively adding a printed component to the product being formed, controlling the product (P) being formed with an optical/electronic control after each adding station (Z.1–Z.4), the controlling including forming and storing an image of an area of a component last added to the product being formed, electronically processing the stored images, forming control signals from the processed stored images, and controlling the further conveying of the products after collecting, inserting and/or collating with the control signals or activating alarm means if the control signals indicate a malfunction in the step of adding.

2. A process according to claim 1 wherein the step of recording includes positioning an image recording means after each addition station (K.1–K.4) outside of the product flow with the image recording means toward the product flow and inclined relative to the conveying direction (F) of the products being formed, with a synchronizing means (T), synchronizing image recording with the conveying of products being formed, with the conveying cycle and with a fine cycle defined by subdividing the conveying cycle, and wherein the electronic processing includes comparing each of the images with a stored calibration image.

3. A process according to claim 2 and including controlling the step of image forming so that an image is formed only after adding stations at which a component is added to the product being formed so that no image is formed when no component is added.

4. A process according to claim 3 wherein the components are collected on saddle-shaped supports and wherein the images are formed from an area of an outer surface of each product.

5. A process according to claim 3 wherein the products are formed by inserting components into products being formed and wherein the images are formed from an area of an inner surface of each product.

6. A process according to claim 3 wherein the products are formed by stacking components onto products being formed and wherein the images are formed from an area of an upper exposed surface of each product.

7. A process according to claim 1 wherein the stored calibration image is formed by a process including the steps of starting production with no control signal, stopping the flow of products being formed when the products being formed have moved away from the addition stations and each product being formed has a proper component added thereto from the preceding addition station, setting the positions of the image recording means, and forming an image of each last-added component for subsequent comparison with images formed during production.

8. A process according to claim 7 and including forming the calibration images larger than the images formed during production.

9. A process according to claim 1 wherein the stored calibration image is formed by a process including the steps of starting production printed products, when the products being formed have moved away from the addition stations and each product being formed has a proper component added thereto from the preceding addition station, forming an image of each last-added component for comparison with images formed during subsequent production.

10. A process according to claim 9 and including forming the calibration images larger than the images formed during subsequent production.

11. An apparatus for producing printed products comprising the combination of means for substantially continuously conveying a flow of printed products being formed along a path and for orienting the products being formed generally perpendicular to a direction of motion thereof;

means for adding a printed component at selected ones of a plurality of adding stations;

a plurality of image recording means, each said image recording means being located after an adding station in said direction of motion and being directed toward said path to form an image of printed products being formed;

memory means for storing calibration images of products being formed;

means for comparing said calibration images with images formed during production and for generating control signals for selectively continuing or interrupting production; and means for synchronizing image recording with conveying and with said means for adding for properly timed addition of products at said stations.

12. An apparatus according to claim 11 wherein said means for conveying includes a rotatable drum having a plurality of saddle-shaped carriers and compartments for receiving and supporting products being formed.

13. An apparatus according to claim 11 and further including a light source operatively associated with each said image recording means for illuminating products from which images are being formed.

14. An apparatus according to claim 11 and further comprising visually observable display means (20) for monitoring production.

* * * * *